United States Patent

[11] 3,580,379

| [72] | Inventors | Joseph Shuster<br>Saratoga;<br>Richard L. Brown, Sunnyvale, Calif. |
|---|---|---|
| [21] | Appl. No. | 823,840 |
| [22] | Filed | May 12, 1969 |
| [45] | Patented | May 25, 1971 |
| [73] | Assignee | Icore Industries |

[54] PACKAGE TURNING DEVICE
4 Claims, 6 Drawing Figs.

| [52] | U.S. Cl. | 198/31AB, 198/33AB |
|---|---|---|
| [51] | Int. Cl. | B65g 47/24, B65g 47/26 |
| [50] | Field of Search | 198/31 (A1), 31 (A2), 31 (A3), 33 (R2) |

[56] References Cited
UNITED STATES PATENTS 3,009,572  11/1961  Seaborn .................. 198/31X(A2)

*Primary Examiner*—Edward A. Sroka
*Attorney*—Eckhoff & Hoppe

ABSTRACT: A package turning device wherein a package is supported on a series of carriers which are free to slide from side-to-side on rods carried by endless chains on each side of a conveyor. The turning action is provided by a switching mechanism whereby the front portion of the carton is conveyed in one direction by a series of carriers while the rear portion of the package is supported on carriers which are switched to a different direction, so that as the package travels it is turned about 90° to its previous orientation. In a preferred embodiment of the device, two lanes are provided so that a series of packages in single file are divided into two files with the packages turned at 90° to their former orientation.

INVENTORS
JOSEPH SHUSTER
BY RICHARD L. BROWN
Eckhoff & Hoppe
ATTORNEYS

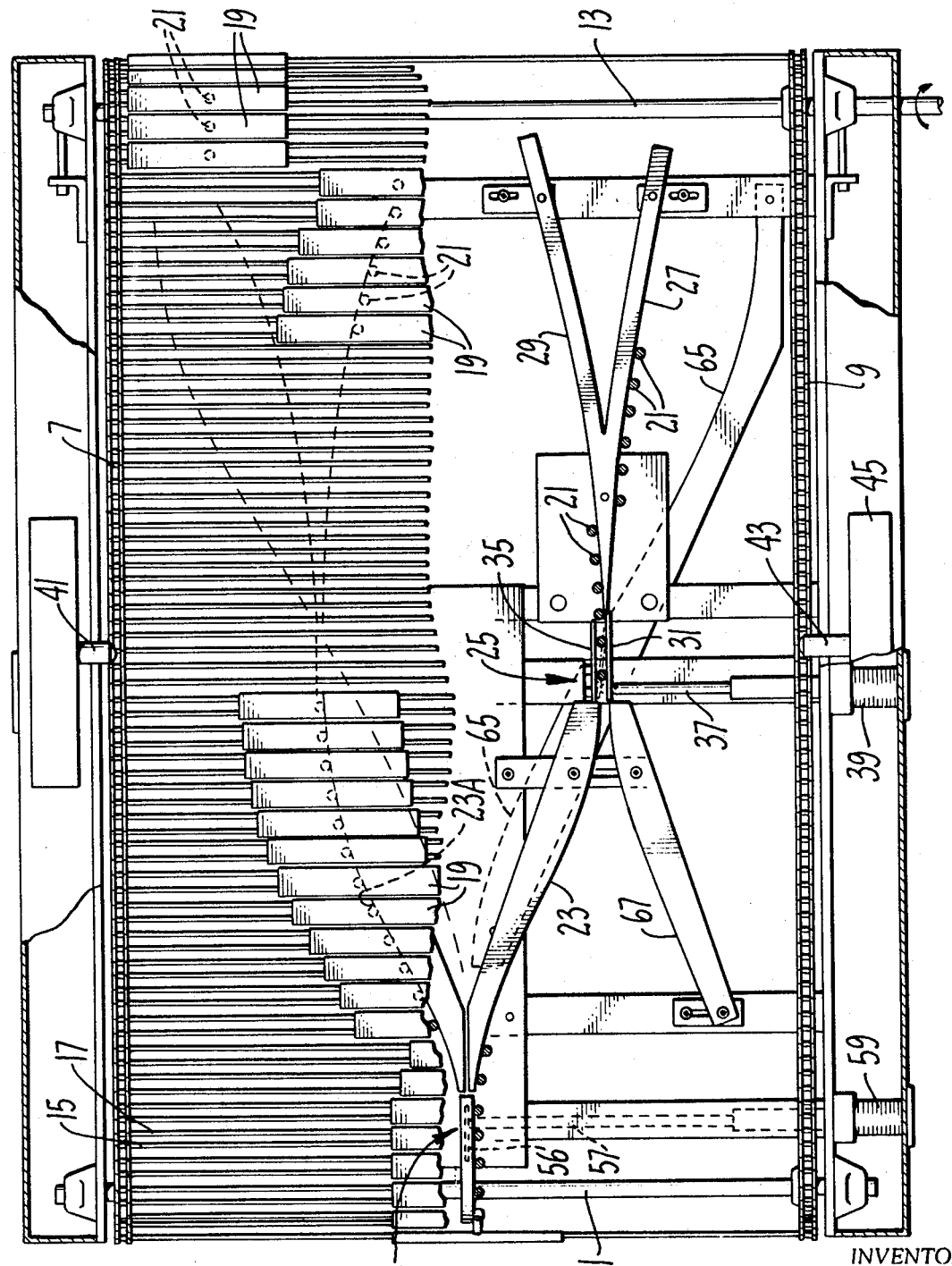

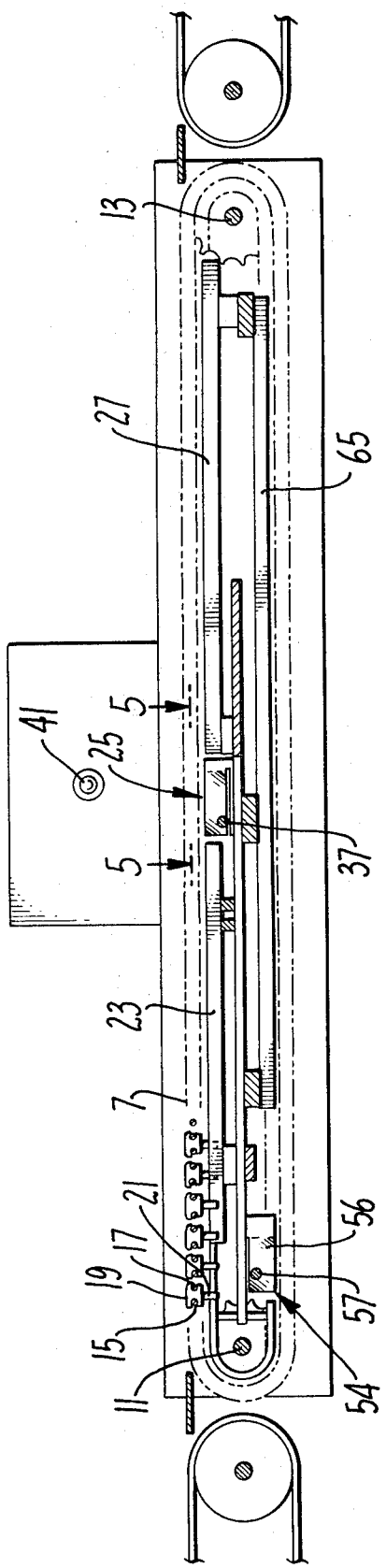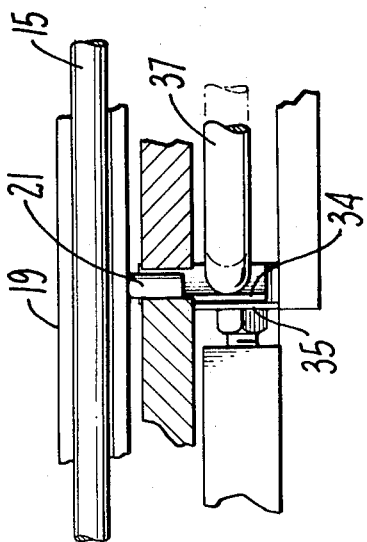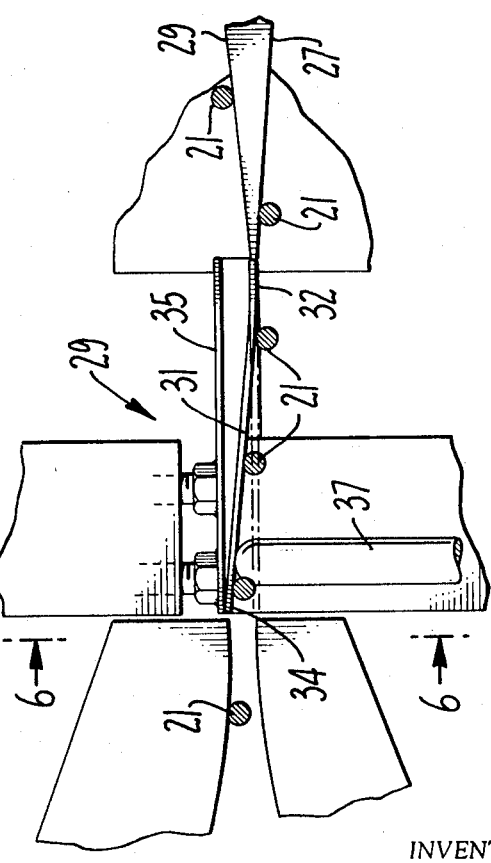

PACKAGE TURNING DEVICE

SUMMARY OF THE INVENTION

In many industries, such as in food packaging plants, packages are conveyed on various types of conveyors from one operation to the next. In many instances it is desirable to provide a turning device for the packages since for one operation it may be necessary to have the packages oriented in a first direction and for a second operation to have them oriented at right angles thereto. Also, in many operations, it is desirable to provide a means for dividing a single file of articles on a conveyor into a double file of articles on other conveyors. The present invention provides a completely automatic device wherein articles conveyed along a line are turned at 90° to their former path of travel. In accordance with a preferred embodiment of the invention, a single file of articles is divided into multiple files with the articles coming off the conveyor at about 90° from their former orientation.

A particular advantage of the present invention is that the packages are handled very gently and not subjected to any abrupt turning movements so that it is entirely practical to use the conveyor of the present invention on articles which must be handles gently such as packages which have been filed but not yet closed.

BRIEF DESCRIPTION OF THE DRAWINGS

In the drawings forming part of this application:

FIG. 3 is a plan view of a device embodying the present invention showing certain of the parts cut away.

FIG. 4 is a side elevation of the device shown in FIG. 3.

FIG. 5 is an enlarged section on the line 5–5 of FIG. 4.

FIG. 6 is a section on the line 6–6 of FIG. 5.

DESCRIPTION OF THE PREFERRED EMBODIMENTS

Figure 1:
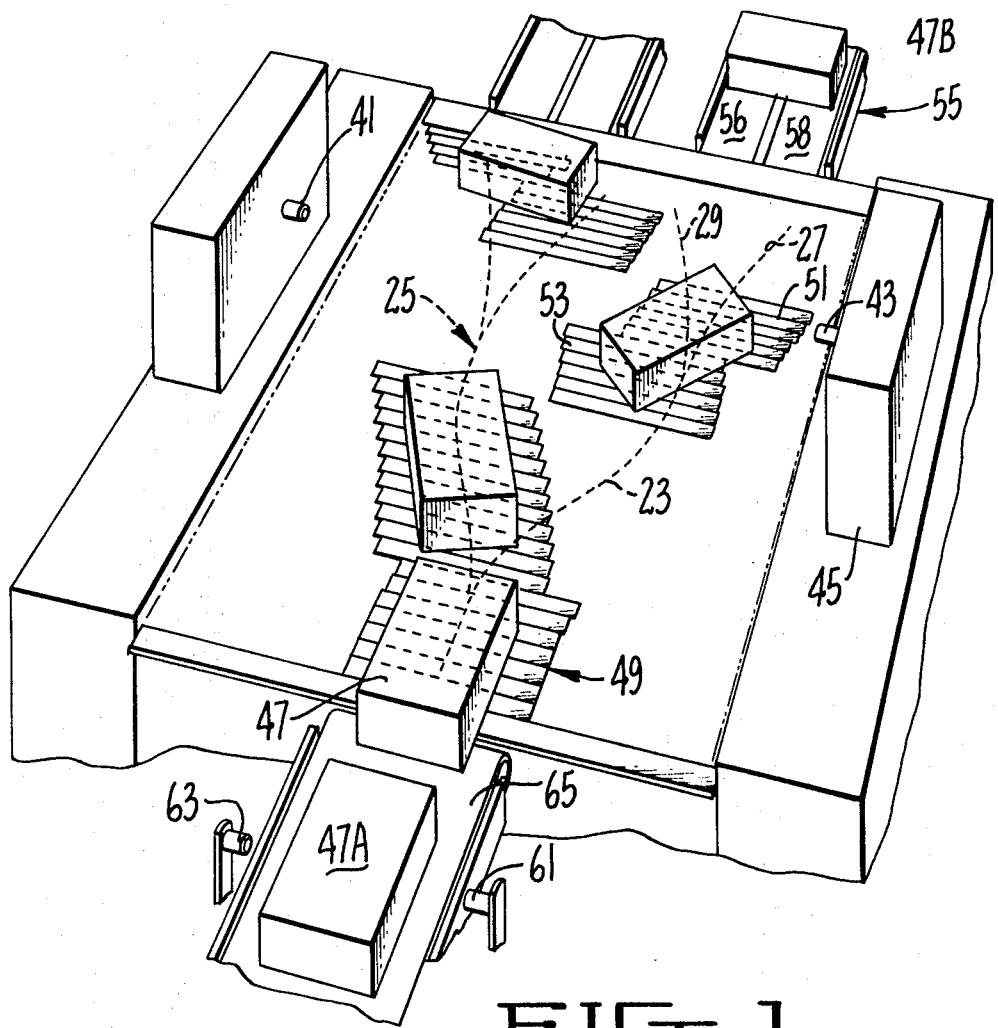
FIG. 1 is a perspective view of a device embodying the present invention.

The basic structure of the conveyor forming part of the present invention is shown in U.S. Pat. No. 3,129,803 so that certain details of construction are not described in the present specification but will be readily apparent to those familiar with the art.

The conveyor of the present invention includes a pair of endless chains 7 and 9 carried by sprockets on shafts 11 and 13. Shaft 13 is driven by a suitable motor, not illustrated. The endless chains have a series of rods as at 15 and 17 running between them. Between adjacent pairs of rods are the carriers 19 which are free to slide back and forth on the rods and each of which has a depending pin 21. The structure thus far described, is that shown in U.S. Pat. No. 3,129,803 and it will be apparent that as the shaft 13 is turned in the direction shown by the arrow, articles will be conveyed from left to right if they are placed on the carriers 19. It is also apparent, that the position of the carriers 19, and thus the position of the articles being conveyed, can be controlled by the use of suitable cam means acting on the pins 21.

In the embodiment illustrated, a dual track device is illustrated. Only one of the tracks will be described in detail since the other track is a mirror image. Thus, starting near the entrance end of the conveyor is a cam 23 which causes the carriers engaged by the cam to be diverted in a path generally angular to the general direction of travel. About half way along the path of the conveyor, a switch generally designated 25 is employed and beyond the switch is a cam 27 which represents substantially a continuation of the cam 23 so that a carrier which is engaged first by the cam 23 and then by the cam 27 will move in a substantially smooth angular path laterally of the conveyor as it goes along the conveyor. Beyond the switch 25, another cam 29 is provided which makes an acute angle with cam 27. A carrier which first follows the cam 23 and then is switched to cam 29 will first move in one direction laterally of the conveyor and then as it passes the switch and engages cam 29 will reverse its lateral direction and now be propelled back toward the center of the conveyor.

For effecting the switching action a leaf-spring 31 is employed which is attached to point 32 so that the entrance end 34 of the leaf-spring is free. In order to provide a positive action, a back up member 35 generally parallel to the leaf-spring 31 is employed. In order to actuate the switch mechanism, a rod 37 bears against the leaf-spring 31 and is actuated by a solenoid 39. Adjacent to the path of travel a light source 41 is employed which normally falls upon a photocell 43. The photocell 43 is mounted on a control box 45 which in turn is connected to the solenoid 39. The light beam is positioned so that it is interrupted when a package is about half way across the switch. As soon as the package passes the switch the circuitry is restored to its former condition.

Figure 2:
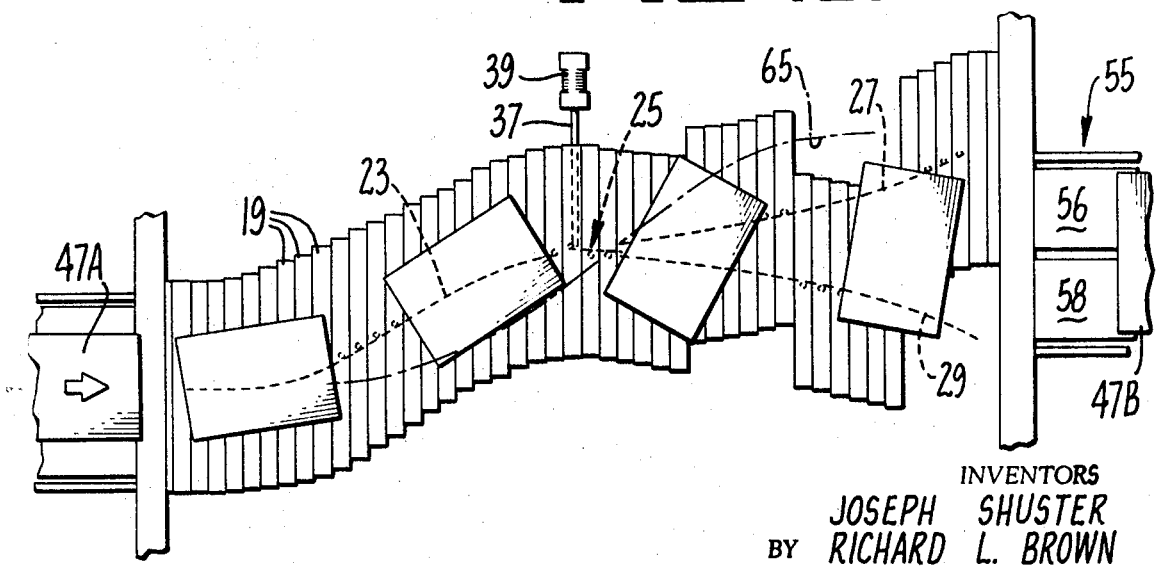
FIG. 2 is a partial plan view of the device shown in FIG. 1 showing one of the paths of the conveyor.

The general mode of operation can best be understood with the reference to FIGS. 1, 2 and 3. As is shown in FIG. 1, a package 47 enters the conveyor and is engaged by a group of carriers collectively designated 49. These carriers all follow the path 23 until the package is about the center of the conveyor whereupon the carriers designated 51 on which the forward part of the article is supported follow generally the same path on which they were before, i.e., that provided by cam 27. However, as the package 47 gets about half way across the switch, the photocell causes the switch to be opened, so that those carriers designated 53 carrying the back end of the package are now diverted to the track 29. Thus, the forward end of the package is conveyed in a more or less straight angular path across the conveyor while the carriers supporting the rear portion of the package are diverted to a new path as can be seen in FIGS. 1 and 2, so that as the conveyor continues to move, the package is turned to almost 90° whereupon it is discharged onto a conveyor 55. As can be seen from comparing package 47–A with package 47–B it will be seen that the package has been turned 90° to its former path of travel.

As can best be seen in FIG. 2, the turning movement is not quite 90°. Although this is sufficient for most applications, a split off take conveyor may be employed to complete the turning movement. Thus the conveyor 55 may have two treads 56 and 58. If 58 is operated at a speed slightly greater than 56, the turning movement will be completed to the full 90°.

In one practical embodiment of the invention, it was desired not only to turn the packages 90°, but also to divide a single file of packages into a double file. Thus, referring particularly to the structure shown in FIG. 3, a double entering cam is provided namely that previously described as 23 and a mirror image thereof designated 23–A. A switch generally designated 54 having a leaf-spring 56 actuated by a push rod 57 which is in turn energized as solenoid 59 is used to divert the carriers slightly to one side or the other. The switch 54 lies under path of travel as is described in U.S. Pat. No. 3,129,803 so that the carriers are diverted slightly to one side or the other while they are still on the return path under the conveyor. Thus, as the carriers arrive at the top of the conveyor in a position to receive a package, they have already been diverted slightly to one side or the other so as a package gets on to the conveyor, the carriers will follow the cam 23 or its mirror image 23–A dependent upon the prepositioning of the carriers. In one embodiment of the invention, the switch 54 is actuated by the combination of the light 61 and photocell 63 which are arranged across the entrance conveyor 65. These actuate a flip-flop circuit to operate the solenoid 59 on alternate packages so that one package follows the path 23, the next the path 23–A and so on.

It will be understood that cam 23–A leads to a switch and double cam mechanism as previously described. The switch on this path is connected to the same circuit and actuated at the same time as switch 25. In other words, it is not necessary to provide any discrimination between paths and both switches will be actuated as the light beam 41 is interrupted by a package following either path. This causes no difficulty since only one of the paths is occupied at the switch position at any given time.

Lying under the conveyor are the cams 65 which serve to return the carriers to their former position as the carriers pass under the conveyor on their return trip. Safety cam 67 may also be provided so that if the carrier is accidentally displaced on the conveyor, the cam will direct it back to the switch mechanism and thus return it to the stream of carriers.

Although a preferred embodiment has been shown, it will be understood to those skilled in the art that the principles of the present invention may be applied to other structures. For instance, there is no need to provide the double path and the invention is perfectly operable without the use of the switch 54 and with a single path for articles across the conveyor. Also, more than two paths might be employed so that the articles might be divided into three or more paths in accordance with the teachings of U.S. Pat. No. 3,129,803. Further, more than one path might be provided across the conveyor with each of the paths being independent, for example, two entrance conveyors might be employed as well as two exit conveyors with entirely independent paths across the conveyor wherein the articles are turned as they pass across the conveyor of the present invention.

We claim:

1. A turning device comprising in combination;
   a. an endless conveyor having an entrance end and a discharge end,
   b. means for driving said conveyor in a single direction,
   c. a plurality of carriers slidably mounted on said conveyor for movement laterally thereof perpendicular to the direction of movement of said conveyor,
   d. a cam follower on each of said carriers,
   e. a first cam track extending from the entrance end of the conveyor to the discharge end of the conveyor, said first cam track having a generally angular path whereby a carrier which follows said path is displaced laterally in one direction as it passes over the conveyor,
   f. a second cam track starting at about the midpoint of the conveyor and joining the first cam track and extending to the discharge end of the conveyor, said second cam track defining a diverging track from the first cam track whereby a carrier which is diverted to and follows said second cam track is displaced in a lateral opposite direction with respect to its former direction and arrives at the discharge end of the conveyor laterally nearer to its entrance position than carriers which follow said first cam track, and
   g. switching means whereby carriers can be directed to follow the first cam track from the entrance end to the discharge end of the conveyor or can be diverted to follow the second cam track to the end of the conveyor.

2. The structure of claim 5 wherein a package sensing device is employed to actuate the switch, and wherein a package is carried on a plurality of carriers and said sensing means actuates said switch when a package is about half way across the switch.

3. The structure of claim 2 wherein the package sensing means comprises a light path across the conveyor and light sensing means.

4. The structure of claim 5 wherein the first and second cam tracks are paired and wherein switching means is provided at the entrance end of the conveyor to switch alternate packages from one set of cams to the other set of cams.